US 6,690,744 B2

(12) United States Patent
Hedberg

(10) Patent No.: US 6,690,744 B2
(45) Date of Patent: Feb. 10, 2004

(54) DIGITAL LINE DRIVER CIRCUIT

(75) Inventor: Mats Olof Joakim Hedberg, Haninge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 10/143,706

(22) Filed: May 8, 2002

(65) Prior Publication Data

US 2002/0168024 A1 Nov. 14, 2002

(30) Foreign Application Priority Data

May 11, 2001 (EP) .............................. 01111188

(51) Int. Cl.[7] ...................... H04L 25/03; H04L 25/00
(52) U.S. Cl. ........................... 375/296; 375/257
(58) Field of Search ................ 375/257, 258, 375/295, 296, 286, 288, 285

(56) References Cited

U.S. PATENT DOCUMENTS 3,980,826 A * 9/1976 Widmer ..................... 375/258
4,584,690 A   4/1986 Cafiero et al. ............. 375/18
5,164,960 A * 11/1992 Wincn et al. ............... 375/224

FOREIGN PATENT DOCUMENTS

| DE | 198 25 258 A1 | 12/1999 |
| DE | 199 47 094 A1 | 5/2001 |
| WO | WO 00/18075 | 3/2000 |

OTHER PUBLICATIONS

Widmer, "Single–Chip 4X 500–MBd CMOS Transceiver," IEEE Journal of Solid State Circuit, vol. 31, No. 12, Dec. 1996, pp. 2004–2014.*

Farjad–Rad et al., "A .4–microM CMOS 10–Gb/s 4–PAM Pre–Emphasis Serial Link Transmitter," IEEE Journal of Solid State Circuit, vol. 34, No. 5, May 1999, pp. 580–585.*

* cited by examiner

Primary Examiner—Tesfaldet Bocure

(57) ABSTRACT

A digital line driver circuit 1 for driving a transmission line and being arranged to receive a digital input signal Di and output a digital output signal in accordance with said digital input signal Di, said digital line driver circuit being operable in at least a first and a second mode in accordance with a mode selection signal Pe, wherein said first mode is a signal relay mode in which said digital output signal follows said digital input signal, and said second mode is a pre-emphasis mode in which said digital output signal follows said digital input signal and has an additional predetermined distortion.

15 Claims, 8 Drawing Sheets

DIGITAL LINE DRIVER CIRCUIT

BACKGROUND OF THE INVENTION

The present invention relates to a digital line driver circuit for driving a transmission line, and to a method of operating a digital line driver circuit.

It is well known that when transmitting a signal over a frequency dependent medium like a real transmission line having frequency losses or over an optical cable, the signal shape will change in the course of the transmission. A bandwidth limited electrical transmission line will for example cause higher losses in high frequency components of a transmitted signal than in lower frequency components. The effect of the transmission medium on the signal is the more pronounced the higher the frequency components of the signal to be transmitted is, and the longer the transmission length through the medium is. This effect imposes limits on the maximum transmission length and/or the maximum speed of a signal transmission system having a signal driver at an input side of the transmission medium and a receiver for receiving signal outputs by the transmission medium at the other side.

Modern communication systems use digital signals for carrying information. Generally speaking, a digital signal generally consists of a random sequence of so-called symbols, each representing one or more data bits. When a digital signal is transmitted over a frequency dependent medium like a transmission line, the transmitted digital signal will suffer from the distortion even if there is perfect matching at the receiver side and at the transmitter side, because the higher order harmonics in the signal spectrum suffer from higher losses than lower frequency components of the signal spectrum. Shorter pulses in the digital signal at the receiver side will not reach their full amplitude and the slope of the rising and falling edges in the signal seen by the receiver will deteriorate. This effect, also called inter symbol interference (ISI) imposes limits on the data rate that the receiver will be able to detect.

It is known to increase the limits of the data rate or the transmission length over a given medium by means of pre-distorting the digital signal at the input side of the medium. Broadly speaking, the pre-distortion takes into account the distortion caused by the transmission medium, by means of emphasizing components of the signal to be transmitted that will suffer from loss in the transmission medium. This technique is also known as pre-emphasis.

As disclosed e.g. in DE 198 25 258 A, a conventional way to provide a digital data signal with pre-distortion or pre-emphasis is to delay the digital signal by one bit period or a predetermined fraction of the bit period and to combine the amplitude of the digital signal and the delayed digital signal. From this document an output buffer circuit is known that is able to provide a digital output signal with pre-distortion by means of determining the output signal level depending not only on the current data bit to be transmitted, but also dependent on the history fo the output signal.

U.S. Pat. No. 4,584,690 discloses minimizing the effect of inter symbol interference by provision of digital pre-compensation in the transmitted signal, in order to maximize the slew rate between consecutive bits. From this document, it is known to base the pre-compensation scheme on knowledge of the bit pattern and the amount of energy contained in a sequence of bits.

From IEEE Journal of Solid State Circuits, volume 34, no. 5, May 1999, pages 580 to 585 a so-called full bit pre-distortion combines the amplitudes of the digital data signal with the weighted amplitudes of one or more delayed versions of the digital data signal, each delayed version having a delay of one or more full bit periods relative to the undelayed digital data signal. The number of delayed versions of the digital data signal with different delay that are combined together determine the so-called order of pre-distortion. It is known from this document that partial bit pre-distortion is equally well feasible by means of combining the digital data signal with a delayed version of it, the delay being set to p times to bit period. The typical value of p is 0,5, this being called half bit pre-distortion.

It is to be noted that the term "bit" in this context does not necessarily mean a unit of information or a data unit. Rather, in the context of pre-distortion or pre-emphasis this term generally refers to a repetitively at random occurring constant amplitude segment of minimum duration in the digital data signal. In the special case that the digital data signal format is binary providing two symbols represented by two different signals, one representing logical "0" and the other level representing logic "1", then a segment of minimum duration have the same duration as a bit period. There exist, however, other well known digital signal formats wherein a segment of minimum duration has a duration different from the duration of an information bit.

OBJECT OF THE INVENTION

It is the object of the present invention to provide an improved driver circuit for outputting digital signals to a transmission line, where said driver circuit provides pre-emphasis capabilities. It is also an object to provide an improved method of operating such a digital line driver circuit.

SUMMARY OF THE INVENTION

These objects are achieved by a digital line driver circuit as described in claim 1, and by a method of operating a digital line driver circuit as described in claim 14. Advantageous embodiments are described in the dependent claims.

In accordance with the present invention a digital line driver circuit is provided that receives a digital input signal and outputs a digital output signal in accordance with said input signal, where the digital line driver circuit is operable in at least a first and a second mode. The respective mode is determined by a mode selection signal. In a first mode no pre-emphasis is added to the output signal. The first mode can, for example, be a signal relay mode in which the digital output signal follows the digital input signal. The second mode is a pre-emphasis mode, in which the digital output signal follows the digital input signal, but has an additional pre-distortion.

Therefore, the digital line driver circuit of the present invention can deliver both signals with and without pre-emphasis. A normal signal may simply replicate or directly follow the input signal, whereas a pre-emphasis signal has added distortion. Therefore, the circuit of the present invention provides the advantage of pre-emphasis if necessary for the specific signal being transmitted or the specific prevailing conditions, but is not restricted thereto, and can also output a normal signal if this is necessary or desired. The present invention therefore provides great flexibility.

The digital line driver circuit comprises a signal processing section and an output stage, where the signal processing section receives the digital input signal and outputs control signals to the output stage. Preferably, the signal processing section contains a delay circuit in order to generate appropriate control signals for the pre-emphasis mode. The use of delays for generating pre-emphasis signals is well known, as mentioned in the introduction. However, it may be noted that the control signals for the pre-emphasis mode may be generated in any suitable or appropriate way. The documents mentioned in the introduction to the specification are herewith incorporated by reference.

The output stage is preferably arranged to have an output impedance matched with the transmission medium, e.g. 50 Ohm, for both differential and common mode transmission. Also it is advantageous to provide an internal supply current balancing mechanism that is able to cancel the internal data signal dependent current load variations. This current load balancing mechanism is arranged to work over a large common mode range. It alleviates the need for internal power supplies with low output impedance and reduces the switching transient load such that decoupling capacitors, if any, between the internal power supply lines and ground can be kept small.

The output stage can be arranged to be fed from external power sources, where the number of external power sources can be equal to the number of levels provided in the signals of the pre-emphasis mode. However, it is equally possible to also provide the output stage with a lesser number of external reference voltages, in which case the output circuits itself may generate appropriate reference voltages e.g. with voltage dividers. The latter alternative has the advantage of reducing the number of external components and complexity.

BRIEF DESCRIPTION OF FIGURES

The present invention will know be described in more detail with reference to a number of preferred embodiments, which are intended to convey a more complete understanding of the invention, but are not to be understood as restricting the invention, and with reference to the enclosed drawings, in which.

DETAILED DESCRIPTION OF INVENTION

Figure 1:
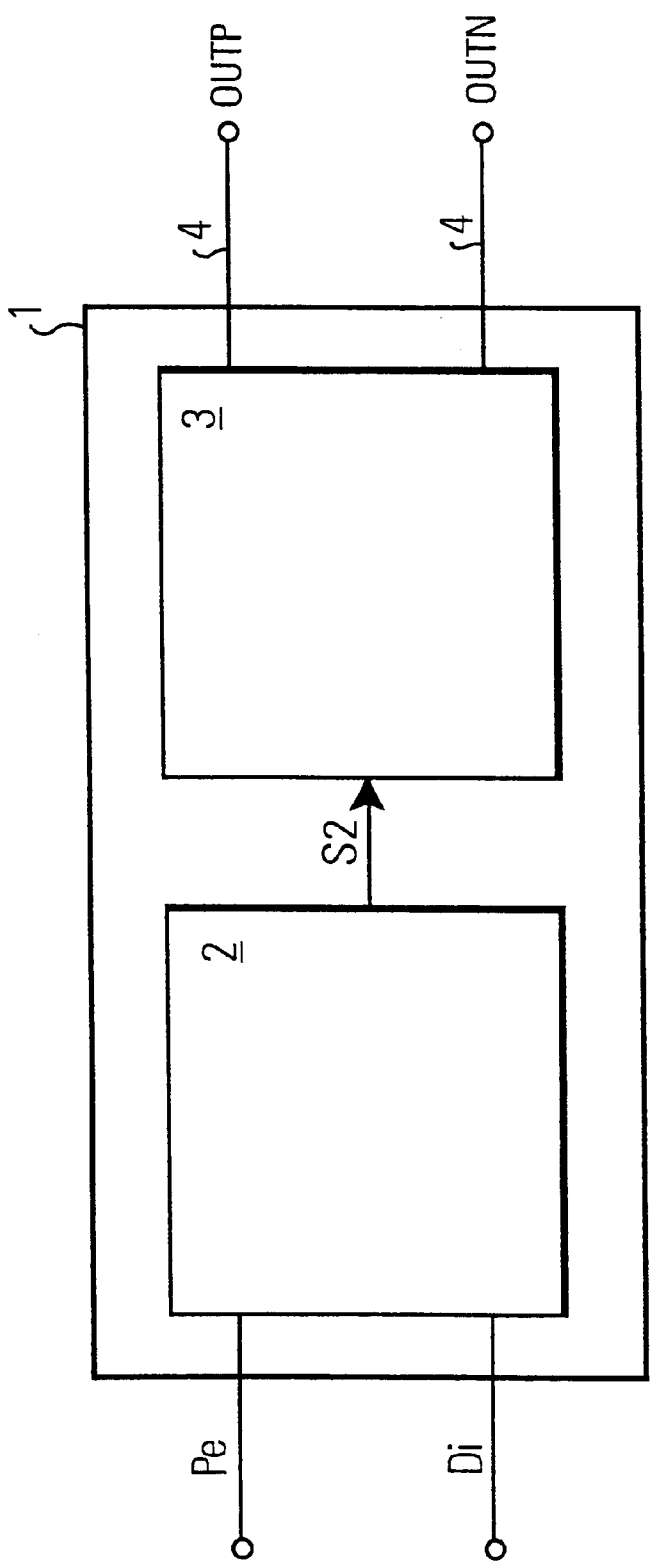
FIG. 1 shows a basic embodiment of the present invention.

In the following description the same reference numerals shall be used for describing the same or equivalent elements throughout all of the figures.

FIG. 1 shows a preferred embodiment of the present invention. Reference numeral 1 describes a digital line driver circuit. Reference numeral 2 describes a signal processing section that receives a digital input signal Di and a mode selection signal Pe. The signal processing section 2 is arranged to output one or more control signals S2. These control signals S2 are provided to an output stage 3, which in turn produces output signals OUTP and OUTN for an output line 4 being driven by the digital driver circuit 1. In accordance with the present invention the signal processing section 2 produces control signals S2 in accordance with a first mode and a second mode, where the first mode is a normal mode, in which the output signal follows the input signal Di, and the second mode is a pre-emphasis mode, in which distortion or pre-emphasis is added. The operation mode is determined by the mode selection signal Pe, which e.g. can simply have two levels where the first level corresponds to the first mode and the second level to the second mode. It should, however, be noted that the circuit 1 of the present invention can also operate in accordance with more than two modes, in which case the mode selection signal Pe will be able to indicate the individual modes appropriately, e.g. by a plurality of levels, or by any other suitable coding mechanism.

Figure 2:
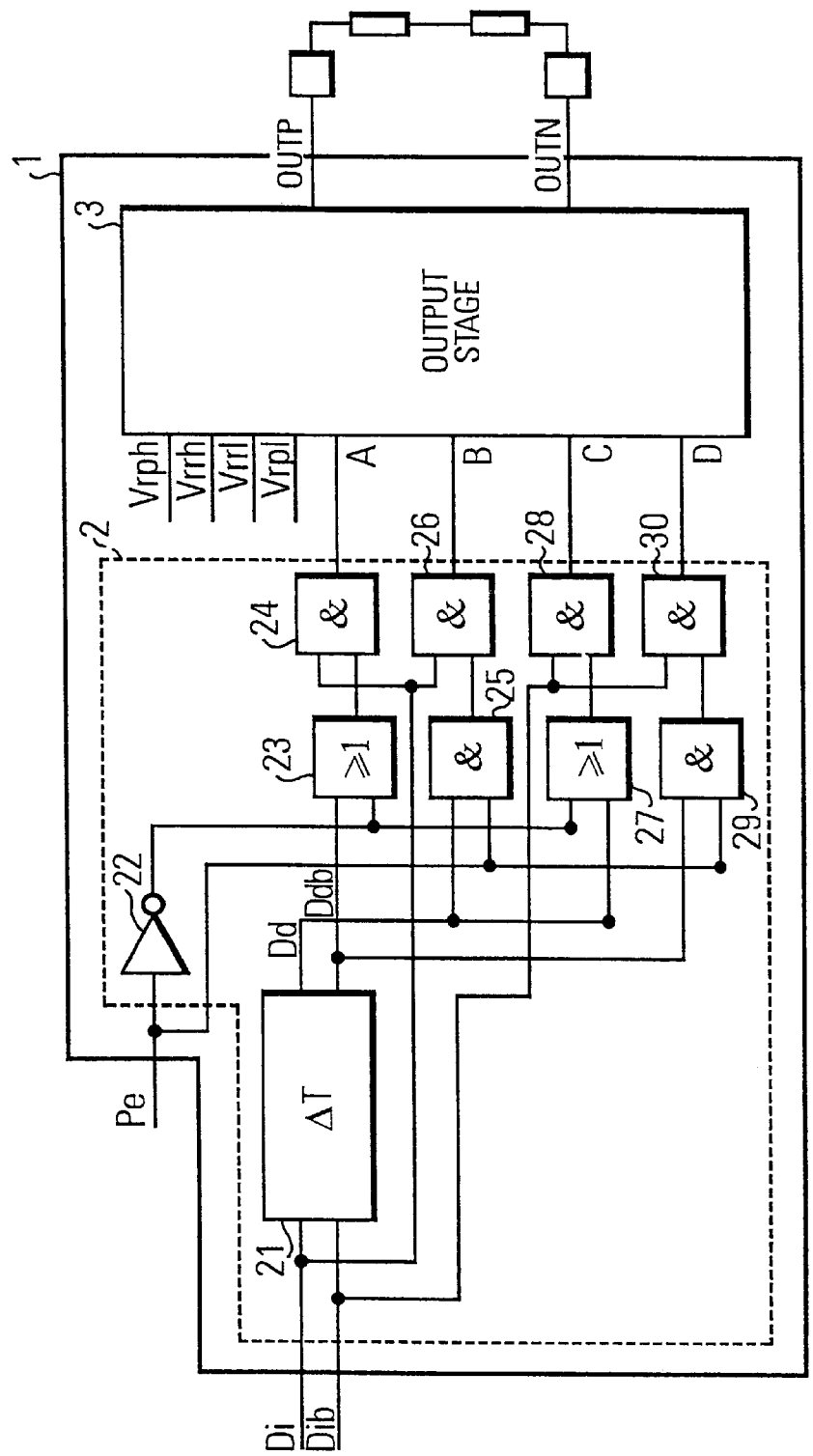
FIG. 2 shows a detailed example of the embodiment of FIG.

FIG. 2 shows a detailed example of the circuit of FIG. 1. In FIG. 2 the signal processing section 2 receives the digital input signal Di and the inverse Dib of the digital input signal Di. It may be noted that the inverse signal Dib can be provided from the outside, or could equally be provided by an appropriate inverter (not shown) in the signal processing section 2. The signal processing section 2 furthermore comprises a delay circuit 21 that provides a delay ΔT to signals input to said delay circuit 21. Both signals Di and Dib are fed to the delay circuit 21, in order to output corresponding delayed output signals Dd (corresponding to Di) and Ddb (corresponding to Dib).

The signal processing section furthermore comprises an input for the mode selection signal Pe, which is fed to an inverter 22. Furthermore, the signal processing section 2 comprises OR gates 23 and 27, as well as AND gates 24, 25, 26, 28, 29 and 30. These gates form a gate section for receiving and processing the input signals Di, Dib and Pe, and the delayed signals Dd, Ddb and the inverted mode selection signal.

More specifically, gate 23 receives the delayed inverted signal Ddb and the inverted mode selection signal, and gate 24 receives the output from gate 23 and the input signal Di. Gate 24 outputs a control signal A. Gate 25 receives the delayed signal Dd and the mode selection signal Pe. Gate 26 receives the output from gate 25 and the input signal Di. Gate 26 outputs a control signal B. Gate 27 receives the inverted mode selection signal and the delayed signal Dd. Gate 28 receives the output from gate 27 and the inverted input signal Dib. Gate 28 outputs a control signal C. Gate 29 receives the mode selection signal Pe and the signal Ddb. Gate 30 receives the output from gate 29 and the inverted input signal Dib. Gate 30 outputs a control signal D.

The control signals A, B, C and D are provided to output stage 3 and correspond to the signals S2 shown in FIG. 1. The different states associated with the various signals will be described further on in connection with FIG. 3.

The output stage 3 is shown as receiving four reference voltages Vrph, Vrrh, Vrrl and Vrpl. Vrph is the peak high reference voltage and Vrpl is the peak low reference voltage, e.g. ground in the case of GLVDS or a somewhat higher level in case of LVDS. Vrrh and Vrrl are intermediate or relaxed voltages that have a value between Vrph and Vrpl. As already mentioned previously, it is not necessary to provide the four shown reference voltages to the output stage 3 and it would e.g. also be sufficient to only provide the peak high reference voltage Vrph and the peak low reference voltage Vrpl, and to arrange the output stage 3 to appropriately generate the intermediate voltages Vrrh and Vrrl.

The different logic states produced by the various signals will now be explained in connection with FIG. 3. The mode selection signal Pe indicates when the pre-emphasis logic is activated or disabled. When the pre-emphasis logic is disabled, the control signals A and C follow Di and Dib, and the two control signals B and D remain low. The output stage 3 is arranged in such a way, that in this working mode only that part of the output stage 3 connected to high and low peak voltages Vph (generated in response to Vrph) and Vpl (generated in response to Vrpl) is active. There are only two "states" used in this working mode, A and C. This is shown on the right hand side of FIG. 3. As can be seen, the output from the output stage 3 exactly follows the input signal Di. This is the normal mode.

Figure 3:
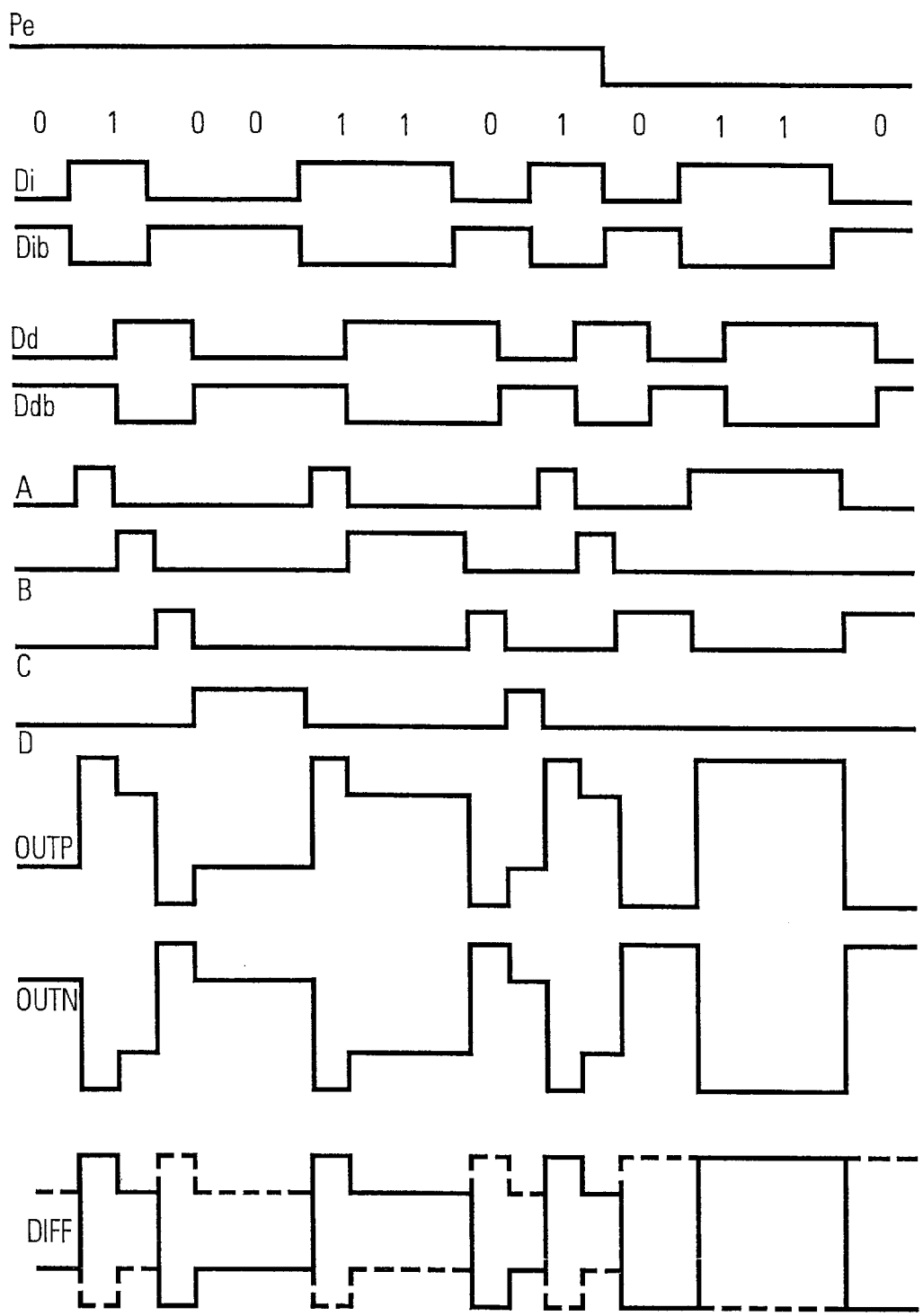
FIG. 3 shows logic state diagrams of a plurality of signals that appear in the circuit of FIG. 2.

On the other hand, as shown on the left hand side of FIG. 3, when the mode selection signal Pe is high, then the pre-emphasis logic is active, and four "states", A, B, C and D occur, which allow the output stage to produce a signal which allows the output stage to produce a signal with pre-distortion or pre-emphasis having four levels, corresponding to the four active control signals A, B, C and D.

In a general sense, when the input signal has n levels, n being an integer, such that the normal mode output signal also has n levels, and the pre-emphasis mode output signal has m levels, m being an integer larger than n, then the signal processing circuit will preferably be arranged to provide n active control signals to the output stage in the normal mode and m active control signals in the pre-emphasis mode, and the output stage will be arranged to generate an n level output signal in the normal mode and an m level signal in the pre-emphasis mode.

The time delay $\Delta T$ determines the length of the pre-emphasis pulse, i.e. the short pulses seen in signals A and C on the left hand side of FIG. 3, while Pe is high. This time delay $\Delta T$ can be as long as the data bit itself, but it can also be shorter, as e.g. seen in FIG. 3, where it is half of a bit interval. As already mentioned previously, in general the precise mechanism for generating pre-distortion can, however, be selected in any desired or suitable way known in the art.

In the example of FIGS. 2 and 3, the input signal Di was a two level signal, such that the output signal in the normal mode was also a two level signal, and the output signal in the pre-emphasis mode was a four level signal. However, the invention is applicable in any system, where the input signal and normal mode output signal generally have n levels, where n is an integer, and where the pre-emphasis mode output signal has m signal levels, where m is an integer larger than n.

Figure 4:
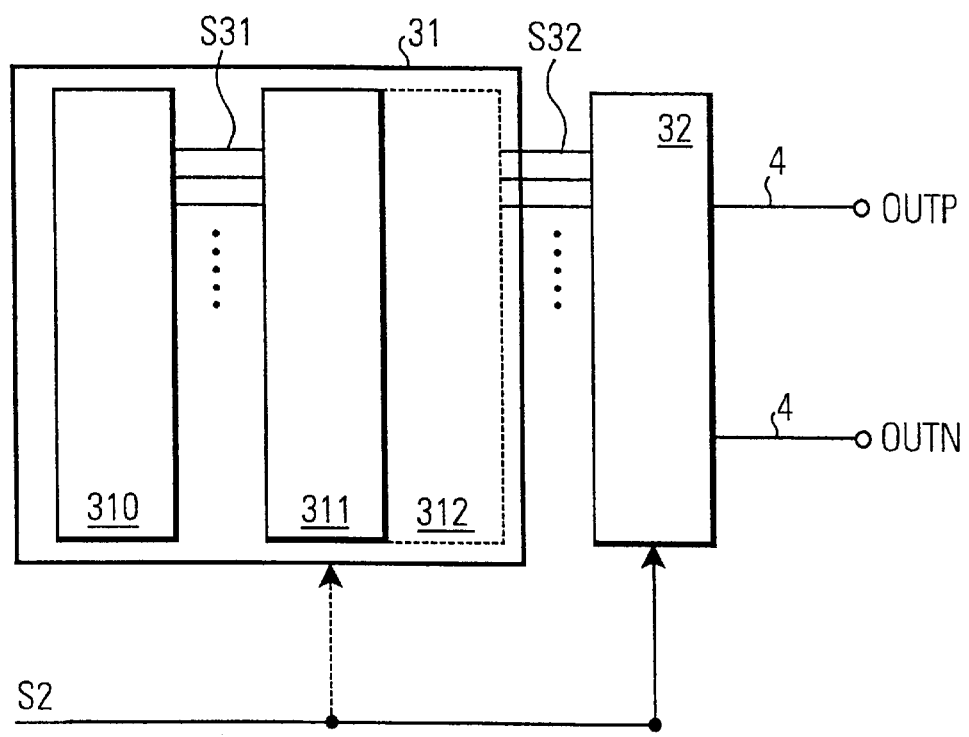
FIG. 4 shows a preferred embodiment of a signal generating section and a signal switching section in an output stage.

FIG. 4 shows a preferred embodiment of the output stage 3. The output stage 3 of FIG. 4 comprises a signal generating section 31 and a signal switching section 32. The signal generating section 31 is arranged to generate and output m signals corresponding to the number of levels in the pre-emphasis mode, indicated as S32 in FIG. 4. Each of these signals S32 has its own distinctive level and an impedance sufficiently low for driving the transmission medium, e.g. a differential transmission line. The signal switching section 32 is arranged to receive these m signals and to receive the control signals S2 (or A, B, C, D) that were output by signal processing section 2. The signal switching section 3 is arranged to switch between the distinctive levels of the m signals in order to generate and output signals OUTP and OUTN. As already explained in connection with FIG. 3, the signal switching section 32 is arranged to only switch between n levels in the normal mode, e.g. two levels in the example of FIG. 3, and between m levels in the pre-emphasis mode, e.g. four in the example of FIG. 3.

The signal generating section 31 of FIG. 4 furthermore comprises a reference voltage providing section 310 arranged to output a plurality of reference voltages S31. In the example of FIG. 2, the reference voltage providing section was simply constituted by the four inputs for the four reference voltages Vrph, Vrrh, Vrrl and Vrpl. As already mentioned, it is also possible that the reference voltage providing section contains circuits for generating or adjusting reference voltages provided from external sources. In general, the reference voltage providing section 310 will output m voltage levels S31, corresponding to the m levels of the pre-emphasis mode, where it may provide these m levels on the basis of m or fewer external voltages.

In FIG. 4 the signal generating section 31 furthermore comprises a signal source section 311 that contains a plurality of impedance conversion devices and is arranged to receive the plurality of reference voltages S31 and to generate m signals S32 in response thereto. The impedance conversion devices may simply be source followers or emitter followers. Advantageously, these devices are constituted to comprise a push pull output stage which is able to source currents as well as sink currents in order to achieve proper source matching of the output to the transmission medium.

It may be noted that although it is preferable that circuit 31 operate on the basis of m reference voltages and m impedance converters in section 311, where each impedance converter is responsible for providing a signal having a distinctive voltage level associated with the respective reference voltage, and m is the number of levels provided in the pre-emphasis mode, it is also possible that a different number of reference voltages is provided and that fewer impedance converters are employed. Namely, one appropriately arranged impedance converter could also be operated to switch between a plurality of output signals S32. In this case the control signals S2 would also be provided to circuit 311, as indicated by the dashed arrow in FIG. 4.

As an option, the circuit of FIG. 4 furthermore comprises a current balancing section 312 arranged to balance the supply currents drawn by the plurality of impedance converters in signal source section 311. The dashed arrow carrying control signals S2 also indicates that when providing the current balancing section 312 in conjunction with the signal source section 311 it is preferable to also control the current balancing section 312 in accordance with the same control signals S2 that control the operation of signal switching section 32. In this way it is possible to reduce spurious noise coupling into other circuits via the power supply rails.

The current balancing section 312 preferably comprises a plurality of switching devices that are controlled in dependence on the control signals S2 and are arranged to selectively provide connections between predetermined outputs of the impedance converters provided in the signal source section 311. These connections have predetermined impedance values.

Figure 5A:
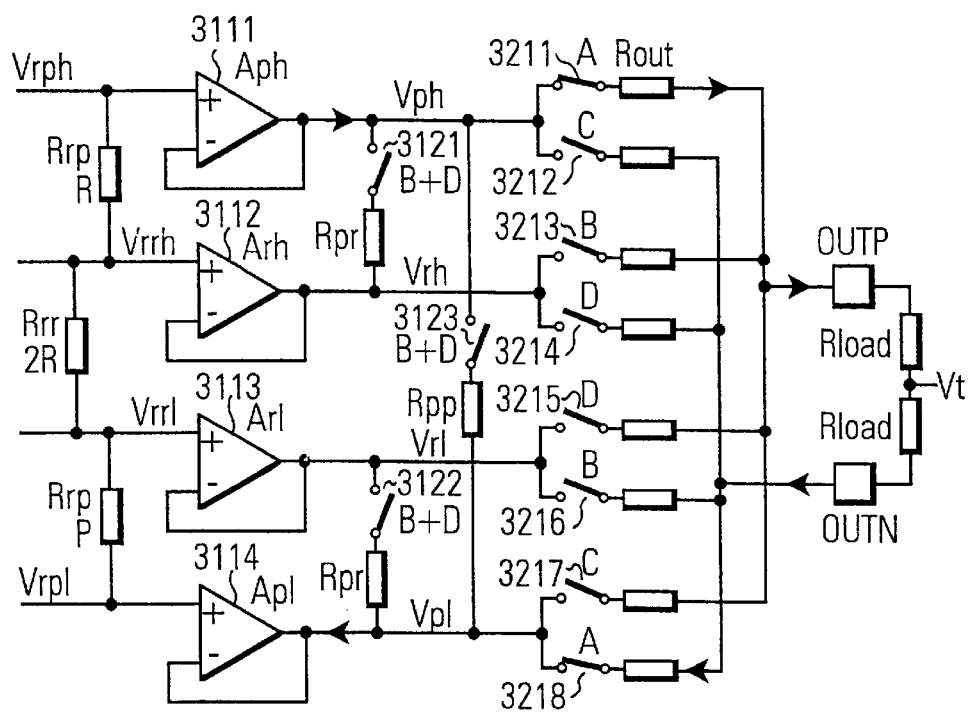
FIGS. 5a and 5b show circuit diagrams explaining the operation of an output stage provided with current load balancing.

The operation of the circuit shown in FIG. 4 shall be explained in more detail with reference to an example thereof shown in FIG. 5a. On the left hand side of FIG. 5a, terminals for the high peak reference voltage Vrph and the low peak reference voltage Vrpl are shown. In the example of FIG. 5a, these are the only reference voltages supplied from external sources. The intermediate or relaxed voltages Vrrh and Vrrl are provided by means of dividing resistors Rrp, Rrr. In the example of FIG. 5a, Rrp has a resistance value R and Rrr has a resistance value 2R. In general, these values may naturally be chosen as is suitable or necessary.

In FIG. 5a operational amplifiers Aph, Arh, Arl and Apl are arranged to be impedance converters 3111, 3112, 3113, 3114 in the signal source section. The impedance converters 3111–3114 receive respective reference voltages Vrph, Vrrh, Vrrl and Vrpl at their non-inverting inputs. The amplifier output is fed back to the inverting input, such that the amplifiers act as low impedance sources for outputting signals at respective voltage levels Vph, Vrh, Vrl and Vpl.

The signals output by the low impedance sources 3111–3114 are provided to the output of the output stage via the signal switching section 32, which comprises switching elements 3211–3218, where each of said switching elements 3211–3218 is controlled in accordance with one of the control signals A, B, C and D, and each has a suitable ON impedance Rout which is preferably selected such that at any time the sum of all impedances connected in series through the transmission medium matches with the characteristic impedance of the transmission medium.

In the example of FIG. 5a, the switching elements 3211–3218 are arranged such that if the shown control signal A, B, C or D is high, then the respective switching element is conductive. In the figure, signal A is assumed to be high, such that switches 3211 and 3218 are conductive, whereas switches 3212, 3213, 3214, 3215, 3216 and 3217 are open (non-conductive).

With this arrangement, the operation as shown in FIG. 3 can be provided. Namely, in the normal mode, in which only control signals A and C are active, only the high peak voltage Vph and the low peak voltage Vpl are switched to the output line 4, in order to produce the two level output signal that strictly follows the two level input signal. On the other hand, during the pre-emphasis mode in which control signals A, B, C and D are active, four signal levels Vph, Vrh, Vrl and Vpl are switched to the output line 4.

FIG. 5a furthermore shows switches 3121, 3122 and 3123 that together constitutes a current balancing section for balancing the supply current drawn by the low impedance sources 3111 to 3114. Switch 3121 is connected between the outputs of sources 3111 and 3112 and is conductive when signal B or D is high, and has an appropriate ON impedance Rpr. Switch 3122 is connected between the outputs of sources 3113 and 3114, is conductive if signal B or D is high, and has a suitable ON impedance Rpr. Switch 3123 is connected between the output of source 3111 and source 3114, is conductive if control signals B or D are high, and has a suitable ON impedance Rpp.

Figure 5B:
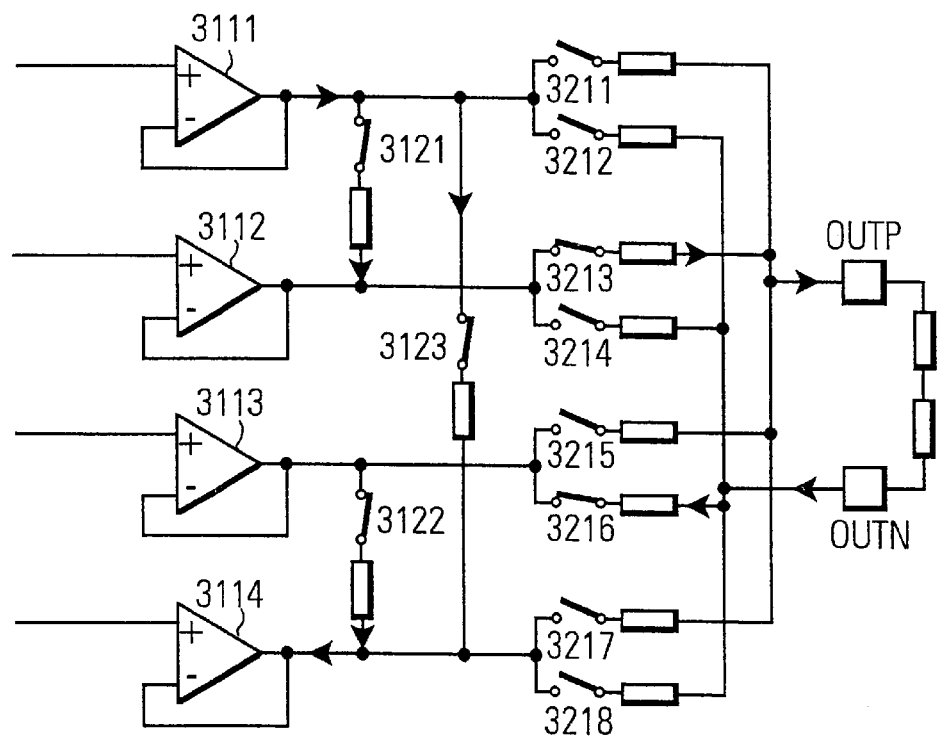

FIG. 5a shows an example where control signal A is high in which case the signal at the high peak level Vph is output via switches 3211 and 3218, and the switching elements 3121 to 3123 of the current balancing section are open (non-conductive). FIG. 5b shows the situation when signal B is high, in which case the switches 3121 to 3123 of the current balance section are closed and the switches 3213 and 3216 act to provide signals of intermediate voltage level to the output in order to generate an output signal having pre-distortion, i.e. having a larger number of signal levels than the input signal.

More specifically, if one assumes Vrph as being 2 V above Vrpl, then the resistor ladder Rrp, Rrr, Rrp in the reference voltage providing section provides intermediate voltages 1.5 V higher than Vrpl and 0.5 V higher than Vrpl for Vrrh and Vrrl (i.e. with Rrp having a resistance value R and Rrr having a resistance value 2R). This voltage combination gives a pre-emphasis grade of 100%. If all the impedances Rout of the switching elements 3211 to 3218 in the switching section are set to be 50 Ohm and the differential characteristic impedance of the transmission line is 100 Ohm, then a proper differential source matching is achieved. The differential voltage across OUTP, OUTN will then be 1 Volt. The current through the load will be 10 mA, and the current is supplied from the two voltage supply amplifiers Aph and Apl, in the directions as indicated by the arrows in FIG. 5a. The two amplifiers in the middle will be active keeping their potentials Vrrh and Vrrl, but idling due to a lack of current load.

It may be noted that the situation for signal C being high is basically equal to the situation shown in FIG. 5a, but with reversed output by the output switches.

In the situation of FIG. 5b, assuming the same parameters as discussed above in connection with FIG. 5a, the switches feed out the relaxed intermediate voltage levels of 1.5 and 0.5 V, which gives 0.5 Volt across the output terminals OUTP, OUTN and a current of 5 mA. In this phase, all the balancing switches 3121 to 3123 are engaged or closed. The upper and lower resistors 3121 and 3122 are dimensioned to feed 5 mA to the load and thereby maintaining the idling of the supply amplifiers 3112 and 3113 in the middle. The middle resistor 3123 is dimensioned to handle the remaining current, 5 mA, to keep the upper and lower supply amplifiers 3111 and 3114 under the same load condition of 10 mA as in the situation described in connection with FIG. 5a.

It may be noted that the situation for signal D being high is basically equal to the situation for signal B being high, but the output is reversed by the output switches.

Accordingly, as long as the output stage is subjected to an impedance matched load, the current to and from the supply amplifiers Aph, Arh, Arl, Apl will be constant due to the balancing devices such that noise coupling into other circuit sections via the power supply lines can be suppressed effectively.

If the load is not matched, or the termination mid point Vp at the other end of the transmission line (see FIG. 5a) is forced in any direction, there will be a modulation of the currents in the output stages. This can lead to a deteriorated output signal if the supply amplifiers have a too high output impedance or too slow response time. Accordingly, it is preferable to use low impedance source circuits having low output impedance and fast response time.

The dynamic response to fast variations like switching transients in the supply voltages can be handled by suitably dimensioned decoupling capacitors (not shown). DC up to signalling frequencies are handled by the supply amplifiers and by the current balancing circuitry.

Figure 6A:
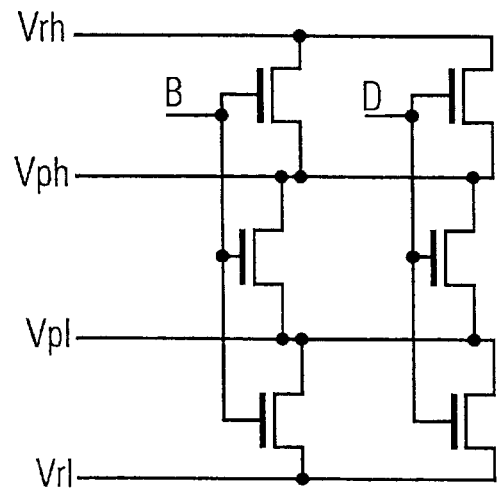
FIGS. 6a and 6b show examples of a current balancing section using MOS technology.
Figure 6B:
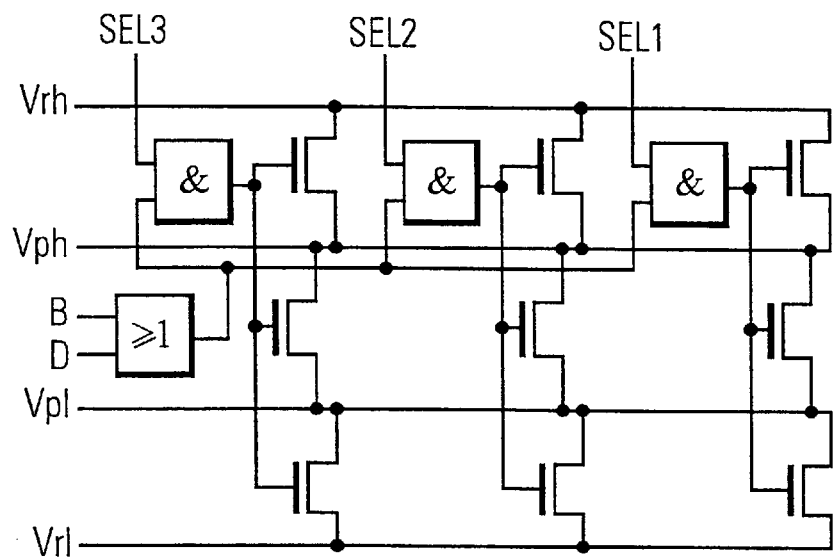
Figure 7A:
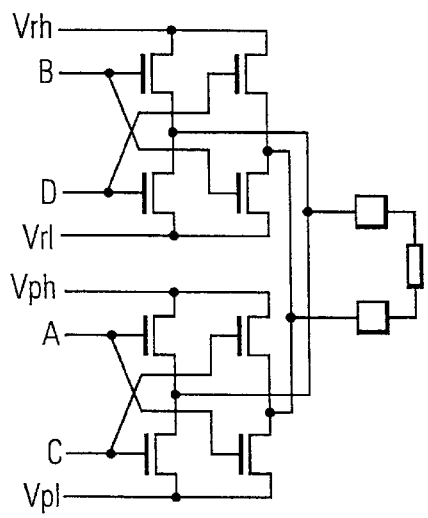
FIGS. 7a and 7b show examples of a signal switching section using MOS technology.

FIGS. 6a and 7a show an implementation example of the output stage shown in the previous figures. FIG. 6a shows an example of the current balancing section, and FIG. 7a shows an example of the signal switching section. In the FIGS. 6 and 7, NMOS devices are shown, which are dimensioned to provide both the switching functionality and the correct ON impedance.

The supply lines Vrh, Vph, Vpl, Vrl shown in the current balancing section of FIG. 6a are shown in a slightly different order than in FIG. 5a, in order to make the drawing simpler. Also, in the example of FIG. 6a, the functionality of the three switching elements 3121 to 3123 shown in FIG. 5 is provided by 6 transistors, in order to make the logic simpler and to maintain a uniform delay. Naturally, it would also be possible to only provide three transistors or to provide more than 6 transistors. When using three transistors, the required response to either the signal B or the signal D can be implemented with an OR gate (see also FIG. 6b).

The signal switching section shown in FIG. 7a forms the 8 output switches 3211 to 3218 and their related output impedances Rout. The supply rails are grouped, the lower part is driven by the peak supplies Vph, Vpl, and the upper part is driven by the relaxed or intermediate supplies Vrh, Vrl.

The dimensioning of the devices is dependent on the required output impedance, their internal source and drain potential and the supply voltage controlling the gates of the devices.

The lower devices connected to ground or the lowest reference potential can be smaller in size, because their gate to source voltages are larger than in devices that are connected to a higher potential. Devices connected with drain and source to higher potential need to be larger due to a smaller gate to source voltage. These dimensions will be individually chosen by a skilled person for a combination of pre-emphasis grade and a desired output voltage, in accordance with individual demands and desires.

In order to serve a number of different output voltages and different pre-emphasis grades, it is preferable to provide a number of different dimensions for the same devices, in order to maintain the correct output impedance. This can be done by providing a number of parallel output units, where each output unit can be individually selected in order to give a correct drive strength to the output. This is shown in FIGS. 6b and 7b, where FIG. 6b shows a current balancing section and FIG. 7b shows a signal switching section.

Figure 7B:
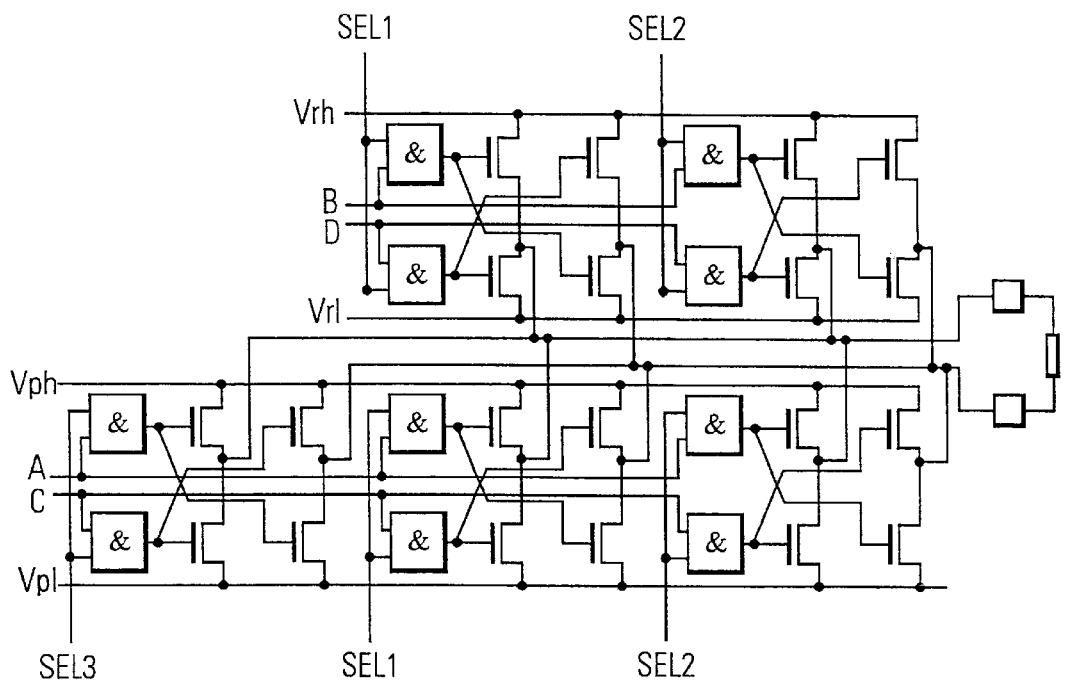

As can be seen in FIGS. 6b and 7b, the appropriate parallel units are arranged to receive a selection signal SEL1, SEL2, or SEL3 for activating each respective unit. The selection signals are fed to AND gates that also receive appropriate control signals A, B, C or D. Each unit is arranged to provide a predetermined respective impedance to the output signal.

The units can either be unique for each operation mode with only one working unit per mode, or have one base stage size which works simultaneously with none or a number of other small delta sized output units.

The latter solution saves both space and lowers output capacitance due to a smaller total area of the devices connected to the output lines. The different dimensioning is also important for the balancing section, which also should be dimensioned for different operating points. The controlling of different drive strength and currents is shown in FIGS. 6b and 7b, where the different parts can be selected by the selection signals SEL1, SEL2, SEL3 and AND gates, which receive the selection signals and respective control signals A, B, C or D.

It may be noted that in FIG. 6b the balancing section uses an OR gate instead of the dual rows of transistors shown in FIG. 6a.

Although the present invention has been explained in conjunction with specific embodiments, the invention is by no means restricted to these specific embodiments, as many variations will occur to the person skilled in the art. For example, although the specific implementation example above showed NMOS devices as driving devices, all of these circuits can naturally also be put to practice with PMOS devices or combinations of NMOS and PMOS devices, depending on the requirements of output voltages and supply voltages. The logic of the corresponding signals, such as the control signals A–D and the mode selection signal Pe must then accordingly be adapted.

The above described examples are not to be understood as restricting the present invention, because the present invention is defined by the appended claims. Reference numerals in the claims are not to be understood as restrictions and only serve to make the claims easier to understand.

What is claimed is:

1. A digital line driver circuit for driving a transmission line, having a signal input to receive a digital input signal and a signal output for outputting a digital output signal in accordance with said digital input signal, said digital line driver circuit being adapted to provide a pre-distortion operating mode in which mode said digital output signal is provided with pre-distortion, and an operating mode without pre-distortion, in accordance with a mode selection signal, the digital line driver circuit comprising:

a signal processing section arranged to receive said digital input signal and said mode selection signal and to output one or more control signals that depend on said digital input signal and on said mode selection signal;

an output stage arranged to receive said one or more control signals and to output said output signal in dependence on said one or more control signals;

wherein said output stage comprises:

a reference signal generating section arranged to generate m distinctive reference signal levels, m being an integer larger than two; and a signal switching section arranged to receive said one or more control signals and said reference signal levels output by said reference signal generating section, and arranged to select among said reference signal levels for coupling with said signal output in accordance with said one or more control signals, in order to generate and output said output signal.

2. The digital line driver circuit according to claim 1, wherein said digital input signal has n signal levels, n being an integer larger than 1, and said digital output signal has n signal levels in said pre-distortion operating mode and m signal levels in said operating mode without pre-distortion, where m is an integer larger than n.

3. The digital line driver circuit of claim 1 or 2, comprising:

a delay circuit arranged to delay said digital input signal by a predetermined delay amount and to output a corresponding delayed signal; and a gate section comprising a plurality of gates for receiving and processing said digital input signal and said delayed signal, and being arranged to generate said one or more control signals.

4. The digital line driver circuit of claim 3, wherein said gate section is arranged to also receive said mode selection signal.

5. The digital line driver circuit according to claim 4, wherein said reference signal generating section comprises:

a reference voltage providing section arranged to output a plurality of reference voltages; and an impedance conversion section comprising a plurality of impedance conversion circuits arranged to receive said plurality of reference voltages and to generate said m signals in response thereto.

6. The digital line driver circuit according to claim 5, further comprising a current balancing section arranged to receive said one or more control signals and to generate currents in accordance therewith in order to balance a supply current of said digital line driver circuit.

7. The digital line driver circuit of claim 6, wherein said current balancing section comprises switching devices controlled in dependence on said one or more control signals and arranged to selectively provide connections between predetermined outputs of said impedance conversion circuits, said connections having predetermined impedance values.

8. The digital line driver circuit of claim 7, wherein said switching devices comprise MOS transistors that also provide said impedance values.

9. The digital line driver circuit according to claim 5, wherein each of said impedance conversion circuits comprises an operational amplifier circuit having a push pull output stage.

10. The digital line driver circuit according to claim 1, wherein said reference signal generating section comprises:
   a reference voltage providing section arranged to output a plurality of reference voltages; and
   an impedance conversion section comprising a plurality of impedance conversion circuits arranged to receive said plurality of reference voltages and to generate said m signals in response thereto.

11. The digital line driver circuit according to claim 10, wherein each of said impedance conversion circuits comprises an operational amplifier circuit having a push pull output stage.

12. The digital line driver circuit according to claim 1, further comprising a current balancing section arranged to receive said one or more control signals and to generate currents in accordance therewith in order to balance a supply current of said digital line driver circuit.

13. The digital line driver circuit of claim 12, wherein said current balancing section comprises switching devices controlled in dependence on said one or more control signals and arranged to selectively provide connections between predetermined outputs of said impedance conversion circuits, said connections having predetermined impedance values.

14. The digital line driver circuit of claim 13, wherein said switching devices comprise MOS transistors that also provide said impedance values.

15. A method for operating a digital line driver circuit that is arranged to receive a digital input signal and to output a digital output signal in accordance with said digital input signal, comprising operating said digital line driver circuit in at least a first and a second mode in accordance with a mode selection signal, wherein said first mode is a signal relay mode in which said digital output signal follows said digital input signal, and said second mode is a pre-distortion mode in which said digital output signal follows said digital input signal and has an additional predetermined distortion, said method comprising the steps of:
   receiving said digital input signal and said mode selection signal and outputting one more control signals that depend on said digital input signal and on said mode selection signal;
   processing said one or more control signals to output said output signal in dependence on said one or more control signals;
   wherein said processing step comprises:
      generating m distinctive reference signal levels, m being an integer larger than two; and
      selecting among said reference signal levels for coupling with said signal output in accordance with said one or more control signals, in order to generate and output said output signal.

* * * * *